3,358,018
METHOD FOR THE EXTRACTION OF CARBOXYLIC ACIDS
Werner Muench, Barlassina, and Giovanna Ielo, Milan, Italy, assignors to Snia Viscosa Società Nazionale Industria Applicazioni Viscosa S.p.A., Milan, Italy, a company of Italy
No Drawing. Filed Apr. 20, 1964, Ser. No. 361,273
Claims priority, application Italy, Apr. 29, 1963, 8,914/63, Patent 694,779
4 Claims. (Cl. 260—514)

In the applicants' U.S. Patent No. 3,022,291 there is described a process wherein e-caprolactam is obtained by nitrosation of particular cyclohexyl compounds such as cyclohexane carboxylic acid and cyclohexyl ketones, in the presence of concentrated sulphuric acid which may contain sulphuric anhydride.

The reaction mixture, which is obtained after the lactamization, always contains besides caprolactam a carboxylic acid. Thus, in the lactamization of ketones e.g. cyclohexyl phenyl ketone and cyclohexyl tolyl ketone, there are obtained benzoic acid and p-toluic acid, respectively, while in lactamization of cyclohexane carboxylic acid, wherein an excess of this acid is present in the lactam solution, cyclohexane carboxylic acid is recovered.

These acids are recovered by hydrolyzing the lactam sulfate in the reaction mixture derived from the lactamization with a quantity of water sufficient to cause precipitation of the carboxylic acid from the resulting aqueous sulphuric acid phase. In general the carboxylic acid does not separate quantitatively and the recovery must be completed with a selective solvent, i.e. a solvent in which the carboxylic acid is freely soluble and the lactam is only slightly soluble.

This method is utilized industrially for the recovery of cyclohexane carboxylic acid in excess from solutions obtained in lactamization with nitrosyl sulphuric acid, in the presence of sulphuric acid containing $SO_3$. As a selective solvent cyclohexane is utilized, which dissolves cyclohexane carboxylic acid freely, while it dissolves lactam only slightly.

Such a method is not readily utilized industrially when the lactam is obtained in the lactamization of a cyclohexyl aryl ketone like cyclohexyl phenyl ketone or cyclohexyl tolyl ketone. During the lactamization of these ketones, aromatic carboxylic acids are formed, viz. benzoic acid or toluic acid, which are only slightly soluble in cyclohexane, wherefore it is practically impossible to recover them with this solvent.

A selective solvent is not known at this time which is generally suitable for the extraction of these acids from mixtures with lactam, except various solvents such as diethyl ether and ethyl acetate which can be utilized only with difficulty on the industrial scale.

When the above-mentioned carboxylic acids are separated from the diluted solution by means of filtration or with a non-selective solvent the acids always contain lactam, separation from which is found difficult and costly on an industrial scale.

It has now been found according to the present invention that carboxylic acids in general including aromatic carboxylic acids as well as cyclohexane carboxylic acid can be recovered free of lactam from the above described reaction mixtures by extraction from the mixture using a solvent as below defined, the said mixture being advantageously diluted with a small amount of water added under conditions and in amounts to avoid hydrolysis of the lactam sulphate in the solution.

For this purpose all solvents are suitable that freely dissolve the acids and which are inert and immiscible in sulphuric acid of concentration at least 55% by weight. It is not necessary that the solvent be one which selectively extracts these aromatic carboxylic acids from ordinary mixtures with lactam, since in the mixtures obtained according to our invention, the lactam is selectively retained in the sulphuric acid phase and only the acids are extracted from these mixtures, even when using solvents which are normally non-selective for separating these acids from caprolactam. The solvents particularly suitable are carbon tetrachloride, benzene, toluene, xylene and chlorobenzene.

For carrying out the method of the present invention we prefer in particular aromatic solvents such as benzene, toluene, xylene and chlorobenzene in view of their availability, solvent power, and chemical stability. The hydrocarbon solvents, however, can be sulfonated by concentrated sulphuric acid, or oleum, particularly when elevated temperatures such as 35° C.–100° C. are used for the extraction. It is advisable therefore to dilute the sulphuric acid solution, containing lactam, with a quantity of water small enough to avoid or at least reduce to a minimum the hydrolysis of the lactam sulphate dissolved in sulphuric acid, but sufficient to minimize any sulfonation of the solvent. Such dilution with water sometimes aids layer separation when using chlorinated solvents, e.g. $CCl_4$. It has been found suitable to dilute the lactam solution with a quantity of water such that the concentration of sulphuric acid will be 55–85%, preferably 65–85%.

In the presence of sulphuric acid in such concentrations we can effect the extraction at elevated temperatures, for example 40–70° C. and thus increase the solubility of the acids to be extracted in the solvent employed.

The carboxylic acids extracted under these conditions are essentially free of lactam. They can be highly purified according to any of the known methods, for example, by means of distillation for benzoic acid and by means of esterification and subsequent distillation for toluic acid.

The following non-limitative examples describe completely specific embodiments of our invention illustrating the best mode contemplated by us of carrying out our invention.

*Example I*

80.4 gr. of cyclohexyl phenyl ketone were lactamized in the presence of cyclohexane, with 57 gr. of nitrosyl sulphuric acid dissolved in 57 gr. of sulphuric acid at a temperature of 30–35° C., as taught in U.S. Patent 3,022,291 (molar ratio between ketone and nitrosyl sulphuric acid= 1:1.04). The reaction mixture was allowed to cool and the cyclohexane layer was separated by decantation and evaporated, affording as residue 6 gr. of benzoic acid free of nitrogen.

From the remaining mixture a 64.8 gr. sample was taken to determine the content in benzoic acid, lactam, unreacted ketone, and resins. It was diluted and the ketone, the resins and the benzoic acid were extracted with ether. After neutralizing the remaining mixture, the lactam was extracted therefrom with chloroform. The quantity of benzoic acid found was 14.95 gr.

64.8 gr. of the above reaction mixture which besides lactam contained 33.3 gr. of sulphuric acid and 14.95 gr. of benzoic acid, was diluted by adding dropwise 8.5 gr. of water cooled to 3° C., while energetically agitating and cooling externally, thus maintaining the temperature of the mixture at or below 15° C. There was obtained in this way a concentration of 79.7% of sulphuric acid based on the sulphuric acid and water in the diluted reaction mixture. To the mass was then added 100 cc. of toluene and the mixture was kept under agitation for 30 min. at a temperature of 60° C. The toluene was decanted and the mass was subjected 3 more times to the same treatment using 40 cc. of toluene each time for a duration of 10 min. All the toluene extracts were combined and evaporated, affording 15.7 gr. of substance free of nitrogen, containing a proportion of 94.4% or 14.81 gr. of benzoic acid corresponding to 99.1% of the benzoic acid present.

*Example II*

90.9 gr. of cyclohexyl p-tolyl ketone was lactamized in the presence of 300 gr. of cyclohexane, with 57.15 gr. of nitrosyl sulphuric acid dissolved in 57.15 gr. of sulphuric acid as taught in U.S. Patent 3,022,291 (molar ratio between ketone and nitrosyl sulphuric acid=1:1). The reaction mixture was allowed to cool and the cyclohexane layer was decanted and evaporated, affording 6.3 gr. of toluic acid free of nitrogen. 66.3 gr. of the reaction mixture were removed for determination, as described in Example I, of the content of toluic acid, unreacted ketone and lactam. The 66.3 gr. of mixture contained 17.35 gr. of toluic acid.

Another 66.3 gr. sample of reaction mixture was diluted, as described in Example I, with 8.2 gr. of water. There was obtained a concentration of 80% sulphuric acid based on there being 32.7 gr. of sulphuric acid and 8.2 gr. of water in the diluted reaction mixture.

A total of 220 cc. of toluene was used for extraction at a temperature of 60° C. as described in Example I. Thereby 17.25 gr. of pure toluic acid was obtained, free of nitrogen, amounting to 99.4% of the toluic acid content found in the sample by analysis.

*Example III*

From a lactam solution, obtained an on industrial scale by treatment of cyclohexane carboxylic acid with nitrosyl sulphuric acid in the presence of sulphuric acid and $SO_3$, 50 gr. were removed which contained 29 gr. of sulphuric acid, 9.05 gr. of lactam and 8.8 gr. of cyclohexane carboxylic acid. The quantity of cyclohexane carboxylic acid was previously determined, on another 50 gr. of the reaction mass diluted with water, by extraction with ether and subsequent re-extraction with sodium carbonate.

A 50 gr. sample of the reaction mass was diluted, while cooling, with 7.25 gr. of water as described in Example I, to bring the concentration of sulphuric acid to 80% based on the sulphuric acid and water in the diluted reaction mixture. The diluted mass was treated with 80 cc. of toluene at a temperature of 40° C. for 30 min., the toluene was decanted and the mass was treated under the same conditions another 3 times with 40 cc. of toluene each time as in Example I.

All the toluene extracts were combined and evaporated whereby 8.7 gr. of cyclohexane carbocyclic acid free of nitrogen was obtained, amounting to 99% of the acid present.

When to 50 gr. of reaction mixture, we added only 5.1 gr. of water whereby the concentration of sulphuric acid contained in the mixture was 85% based on sulphuric acid and water present; and operated under the same conditions described above in this example, the quantity of cyclohexane carboxylic acid free of nitrogen obtained was the same as before.

When for the extraction we used benzene rather than toluene and we operated under the same conditions described above in this example, we obtained the same results. Use of a xylene or mixture of xylenes as the extraction solvent instead of toluene in the procedure of this example also gives essentially the same results. For industrial execution of the extraction we nevertheless prefer toluene inasmuch as this constitutes the initial material for the production of lactam and is therefore convenient to utilize in all the other phases of the procedure.

*Example IV*

65 gr. of reaction mixture obtained essentially as described in Example I and containing besides lactam 17 gr. of benzoic acid and 33.8 gr. of sulphuric acid was subjected to extraction with a total 210 cc. of carbon tetrachloride at a temperature of 35-40° C., first with 90 cc. of solvent and then three times with 40 cc. of solvent each time. The carbon tetrachloride extracts were combined, washed with a little water, and dried; and the carbon tetrachloride was distilled. There remained 16.85 gr. of benzoic acid present.

When we proceeded as previously described, diluting however 65 gr. of reaction mixture before extraction with 2.7 gr. of water whereby to obtain a concentration of 92.5% of sulphuric acid based on the sulphuric acid and water contained in the mass, the layer of carbon tetrachloride separated more easily from the acid layer. The results were identical to those obtained in working without adding water.

When chlorobenzene is substituted as solvent for carbon tetrachloride using otherwise the procedures of this Example IV, essentially the same results are obtained.

The embodiments of the invention in which an exclusive property or privilege is claimed are defined as follows:

1. In a method for the quantitative recovery of carboxylic acids, free from lactam, from the raw product of a lactamisation reaction, said product being a solution which contains said acids, concentrated sulphuric acid, and caprolactam which is hydrolyzable when in the presence of a substantial amount of water, the improvement consisting in
    adjusting, if necessary, the sulphuric acid concentration of said raw product to obtain a concentration from about 65% to about 85%,
    extracting the carboxylic acids at between 35° C. and 100° C. from such raw product with an organic solvent inert and immiscible with sulphuric acid and not selective with reference to the carboxylic acids and caprolactam,
    separating the organic acid phase and
    recovering the carboxylic acid, essentially free of caprolactam, from the organic solvent.

2. The method according to claim 1, wherein said organic acid is an aromatic hydrocarbon, and water is added, if necessary, to reduce the sulfuric acid concentration in the raw product below 85% to prevent sulfonation of said aromatic hydrocarbon.

3. The method according to claim 1, wherein the recovered carboxylic acid is comprised in the group consisting of benzoic acid and toluic acid.

4. The method according to claim 1, wherein the solvent employed for the extraction is at least one member of the group consisting of benzene, toluene, xylene, chlorobenzene, and carbon tetrachloride.

References Cited

UNITED STATES PATENTS 2,556,213  6/1951  Pierotti et al. _____ 260—525 X

RICHARD K. JACKSON, *Primary Examiner.*

LORRAINE A. WEINBERGER, *Examiner.*

S. WILLIAMS, *Assistant Examiner.*